(12) United States Patent
Wei

(10) Patent No.: US 10,649,279 B2
(45) Date of Patent: May 12, 2020

(54) DISPLAY SUBSTRATE, MANUFACTURING METHOD THEREOF, DISPLAY PANEL, AND DISPLAY DEVICE

(71) Applicant: BOE TECHNOLOGY GROUP CO., LTD., Beijing (CN)

(72) Inventor: Wei Wei, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 170 days.

(21) Appl. No.: 15/779,702

(22) PCT Filed: Oct. 20, 2017

(86) PCT No.: PCT/CN2017/107055
§ 371 (c)(1),
(2) Date: May 29, 2018

(87) PCT Pub. No.: WO2018/176815
PCT Pub. Date: Oct. 4, 2018

(65) Prior Publication Data
US 2019/0278119 A1    Sep. 12, 2019

(30) Foreign Application Priority Data

Mar. 31, 2017    (CN) .......................... 2017 1 0209290

(51) Int. Cl.
*G02F 1/13*    (2006.01)
*G02F 1/13363*    (2006.01)
*G02F 1/1335*    (2006.01)

(52) U.S. Cl.
CPC ........ *G02F 1/13363* (2013.01); *G02F 1/1323* (2013.01); *G02F 1/133512* (2013.01); *G02F 1/133528* (2013.01)

(58) Field of Classification Search
CPC .............. G02F 1/13363; G02F 1/1323; G02F 1/133512; G02F 1/133528
See application file for complete search history.

(56) References Cited

U.S. PATENT DOCUMENTS

2011/0102690 A1    5/2011    Kikuchi
2011/0285834 A1    11/2011   Wu
(Continued)

FOREIGN PATENT DOCUMENTS

CN          102067020 A       5/2011
CN          102253495 A       11/2011
(Continued)

OTHER PUBLICATIONS

Shigenori et. al., "Display Device", WO2012144453, machine translation. (Year: 2012).*
International Search Report dated Jan. 19, 2018.

*Primary Examiner* — Wen Huang
(74) *Attorney, Agent, or Firm* — Dilworth & Barrese, LLP.; Michael J. Musella, Esq.

(57) ABSTRACT

A display substrate, a manufacturing method thereof, a display panel and a display device are disclosed. The display substrate includes, first display regions and second display regions located on a base substrate, a parallax barrier and a first phase delay film located on a light emitting side of the display substrate. The parallax barrier includes light transmitting portions, each of the light transmitting portions includes a first light transmitting region and a second light transmitting region, the first light transmitting region completely falls into an orthographic projection of the first phase delay film on the parallax barrier, and the orthographic projection of the first phase delay film is not overlapped with the second light transmitting region, the first phase delay film is configured to make a polarization direction of polar-
(Continued)

ized light emitted from the first light transmitting region is different from that of the second light transmitting region.

15 Claims, 4 Drawing Sheets

(56) References Cited

U.S. PATENT DOCUMENTS

2013/0093956 A1   4/2013  MacLeod
2015/0138455 A1   5/2015  Liao et al.

FOREIGN PATENT DOCUMENTS

| CN | 102799024 A | 11/2012 |
| CN | 102833568 A | 12/2012 |
| CN | 106842649 A | 6/2017 |
| WO | 2012144453 A1 | 10/2012 |

* cited by examiner

DISPLAY SUBSTRATE, MANUFACTURING METHOD THEREOF, DISPLAY PANEL, AND DISPLAY DEVICE

The present application claims priority of China Patent application No. 201710209290.4 filed on Mar. 31, 2017, the content of which is incorporated in its entirety as portion of the present application by reference herein.

TECHNICAL FIELD

At least one embodiment of the present disclosure relates to a display substrate, a manufacturing method thereof, a display panel and a display device.

BACKGROUND

The principle of double-view display is to simultaneously display two different images on one display screen, and viewers in different viewing directions can only see one of the images, so as to achieve simultaneously satisfying different requirements of multiple viewers on one display screen. At present, a parallax barrier is commonly used to achieve a double-vision display effect.

SUMMARY

At least one embodiment of the present disclosure provides a display substrate, a manufacturing method thereof, a display panel, and a display device. The display substrate adopts a combination of a parallax barrier and a specially designed phase delay film to achieve a purpose of increasing a viewing angle.

At least one embodiment of the present disclosure provides a display substrate, including: a base substrate; a plurality of pixels, located on the base substrate and arranged in an array along a first direction and a second direction which are intersected with each other, wherein the plurality of pixels include a plurality of first display regions and a plurality of second display regions which are alternately arranged along the first direction, the plurality of first display regions and the plurality of the second display regions each includes at least one pixel column arranged along the second direction; a parallax barrier, located on a light emitting side of the display substrate and including a plurality of light shielding portions and a plurality of light transmitting portions which are alternately arranged along the first direction, wherein each of the light transmitting portions is opposite to a pair of the first display region and the second display region adjacent to each other, the light shielding portions and the light transmitting portions each extends along the second direction, wherein, along the first direction, each of the light transmitting portions includes a first light transmitting region and a second light transmitting region in sequence; a plurality of first phase delay films, located on the light emitting side of the display substrate and corresponding to the first light transmitting regions of the light transmitting portions respectively, wherein the first light transmitting regions completely fall into an orthographic projection of the first phase delay films on the parallax barrier, and the orthographic projection of the first phase delay films on the parallax barrier is not overlapped with the second light transmitting regions, wherein the first phase delay films are configured to make polarized light emitted from the first light transmitting regions of the display substrate have a first polarization direction, and polarized light emitted from the second light transmitting regions of the display substrate have a second polarization direction, the first polarization direction is different from the second polarization.

For example, the display substrate further includes a polarizer, located on a side of the first phase delay films facing the base substrate.

For example, the display substrate further includes a plurality of second phase delay films, located on the light emitting side of the display substrate and corresponding to the second light transmitting regions of the plurality of light transmitting portions respectively, wherein the second light transmitting regions completely fall into an orthographic projection of the second phase delay films on the parallax barrier, and the orthographic projection of the second phase delay films on the parallax barrier is not overlapped with the first light transmitting regions, wherein the second phase delay films and the first phase delay films are alternately arranged along the first direction, and a phase delay amount of the second phase delay film is different from a phase delay amount of the first phase delay film.

For example, the polarized light is linearly polarized light, the first polarization direction is perpendicular to the second polarization direction.

For example, the polarized light is circularly polarized light, a rotation direction of circularly polarized light emitted from the first light transmitting regions of the display substrate is reverse to a rotation direction of circularly polarized light emitted from the second light transmitting regions of the display substrate.

For example, the second phase delay films and the first phase delay films are located in a same layer.

For example, a center line extending along the second direction of an interval between the first display region and second display region adjacent to each other is overlapped with a center line extending along the second direction of the light transmitting portion corresponding to the first display region and the second display region adjacent to each other, wherein, along the first direction, a size of the first light transmitting region is the same as a size of the second light transmitting region.

For example, the adjacent ones of the first display regions and the second display regions are provided with a black matrix therebetween.

For example, the display substrate is a color filter substrate.

For example, an orthographic projection of the first display regions on the parallax barrier completely falls into the light shielding portions and the first light transmitting regions, an orthographic projection of the second display regions on the parallax barrier completely falls into the light shielding portions and the second light transmitting regions.

At least one embodiment of the present disclosure provides a display panel, including the display substrate according to any one of embodiments, wherein the display substrate is located on the light emitting side of the display panel, and a light emitting direction of the display substrate is the same as a light emitting direction of the display panel.

At least one embodiment of the present disclosure provides a display device, including polarized glasses and the display panel provided by embodiment of the present disclosure, a polarization direction of the polarized glasses is the same as the first polarization direction or the second polarization direction, or a polarization direction of the polarized glasses is configured to be switchable between the first polarization direction and the second polarization direction.

At least one embodiment of the present disclosure provides a manufacturing method of a display substrate, including: forming a plurality of pixels arranged in an array along a first direction and a second direction which are intersected with each other on a base substrate, wherein the plurality of pixels include a plurality of first display regions and a plurality of second display regions which are alternately arranged along the first direction, the plurality of first display regions and the plurality of the second display regions each includes at least one pixel column arranged along the second direction; disposing a parallax barrier on a light emitting side of the pixels, wherein the parallax barrier includes a plurality of light shielding portions and a plurality of light transmitting portions which are alternately arranged along the first direction, each of the light transmitting portions is opposite to a pair of the first display region and the second display region adjacent to each other, the light shielding portions and the light transmitting portions each extends along the second direction, wherein, along the first direction, each of the light transmitting portions includes a first light transmitting region and a second light transmitting region in sequence; forming a plurality of first phase delay films on the light emitting side of the pixels, wherein the plurality of first phase delay films correspond to the first light transmitting regions of the plurality of light transmitting portions respectively, the first light transmitting regions completely fall into an orthographic projection of the first phase delay films on the parallax barrier, and the orthographic projection of the first phase delay films on the parallax barrier is not overlapped with the second light transmitting regions, wherein the first phase delay films are configured to make polarized light emitted from the first light transmitting regions of the display substrate have a first polarization direction and polarized light emitted from the second light transmitting regions of the display substrate have a second polarization direction, the first polarization direction is different from the second polarization.

For example, the manufacturing method of the display substrate further includes: disposing a polarizer on a side of the first phase delay films facing the base substrate.

For example, the manufacturing method of the display substrate further includes: forming a plurality of second phase delay films on the base substrate, wherein the plurality of second phase delay films correspond to the second light transmitting regions of the plurality of light transmitting portions respectively, the second light transmitting regions completely fall into an orthographic projection of the second phase delay films on the parallax barrier, and the orthographic projection of the second phase delay films on the parallax barrier is not overlapped with the first light transmitting regions, wherein the second phase delay films and the first phase delay films are alternately arranged along the first direction, and a phase delay amount of the second phase delay film is different from a phase delay amount of the first phase delay film.

BRIEF DESCRIPTION OF THE DRAWINGS

In order to clearly illustrate the technical solution of embodiments of the present disclosure, the drawings of the embodiments will be briefly described in the following, it is obvious that the drawings in the description are only related to some embodiments of the present disclosure and not limited to the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "include," "including," "include," "including," etc., are intended to specify that the elements or the objects stated before these terms encompass the elements or the objects and equivalents thereof listed after these terms, but do not preclude the other elements or objects. "On," "under," "left," "right" and the like are only used to indicate a relative position relationship, and when the position of the object which is described is changed, the relative position relationship may be changed accordingly.

Figure 1:
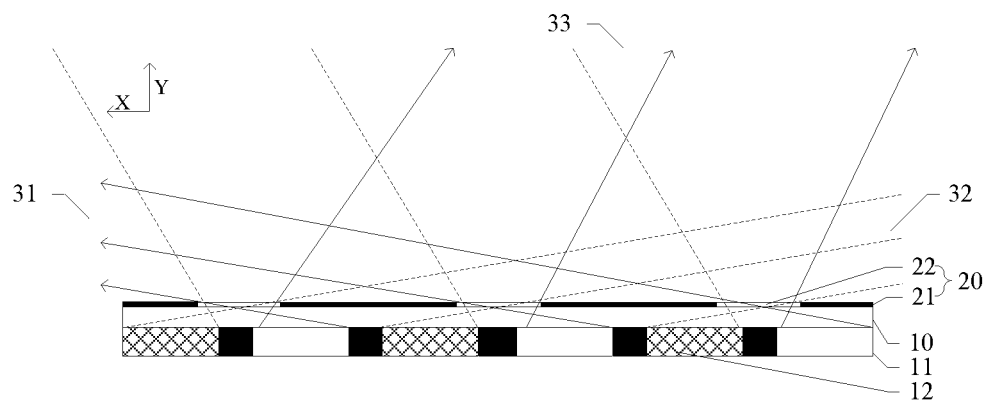
FIG. 1 is a schematic partial diagram of a double-view display device.

FIG. 1 is a schematic partial diagram of a double-view display device. As illustrated by FIG. 1, the double-view display device includes a display substrate and a parallax barrier 20 on the display substrate. The parallax barrier 20 includes a plurality of light shielding portions 21 and a plurality of light transmitting portions 22 which are alternately arranged along the X direction. The display substrate here is a color filter substrate, the color filter substrate includes a base substrate 10 and a plurality of pixels located on a side of the base substrate 10 away from the parallax barrier 20. The plurality of pixels include first display regions 11 and second display regions 12 alternately arranged in the X direction. Image light of the first display regions 11 passes through the plurality of light transmitting portions 22 of the parallax barrier 20 to form a first view region 31 on the left side of the display substrate. In other words, in the first view region 31, only the images displayed in each of the first display regions 11 can be seen. Image light of the second display regions 12 passes through the light transmitting portions 22 of the parallax barrier 20 to form a second view region 32 on the right side of the display substrate. In other words, in the second view region 32, only the images displayed in each of the second display regions 12 can be seen. Image light emitted from the first display regions 11 and the second display regions 12 forms a crosstalk region 33 at a middle position of the display substrate. In the crosstalk region 33, the images displayed in the first display regions 11 and the second display regions 12 can be seen at the same time, resulting in the seen images in the crosstalk region 33 are not clear. In the figure, real lines refer to light rays emitted from the first display regions 11, and dotted lines refer to light rays emitted from the second display regions 12.

In the study, the inventor(s) of the present application found that: in the double-view display technology, there is a central crosstalk region shown in FIG. 1, which displays two display images at the same time, so that the user cannot view the image in central crosstalk region.

Embodiments of the present disclosure provide a display substrate, a manufacturing method thereof, a display panel, and a display device. The display substrate includes a base substrate; a plurality of pixels, located on the base substrate and arranged in an array along a first direction and a second direction which are intersected with each other, wherein the plurality of pixels include a plurality of first display regions and a plurality of second display regions which are alternately arranged along the first direction, the plurality of first display regions and the plurality of the second display regions each includes at least one pixel column arranged along the second direction; a parallax barrier, located on a light emitting side of the display substrate and including a plurality of light shielding portions and a plurality of light transmitting portions which are alternately arranged along the first direction, wherein each of the light transmitting portions is opposite to a pair of the first display region and the second display region adjacent to each other, the light shielding portions and the light transmitting portions each extends along the second direction, wherein, along the first direction, each of the light transmitting portions includes a first light transmitting region and a second light transmitting region in sequence; a plurality of first phase delay films, located on the light emitting side of the display substrate and corresponding to the first light transmitting regions of the light transmitting portions respectively, wherein the first light transmitting regions completely fall into an orthographic projection of the first phase delay films on the parallax barrier, and the orthographic projection of the first phase delay films on the parallax barrier is not overlapped with the second light transmitting regions. The first phase delay films are configured to make polarized light emitted from the first light transmitting regions of the display substrate have a first polarization direction, and polarized light emitted from the second light transmitting regions of the display substrate have a second polarization direction, the first polarization direction is different from the second polarization. The display substrate adopts a combination of the parallax barrier and a specially designed phase delay film to achieve a purpose of increasing a viewing angle.

Hereafter, the display substrate, the manufacturing method thereof, the display panel, and the display device provided by the embodiments of the present disclosure will be described in detail with reference to the accompanying drawings.

First Embodiment

Figure 2:
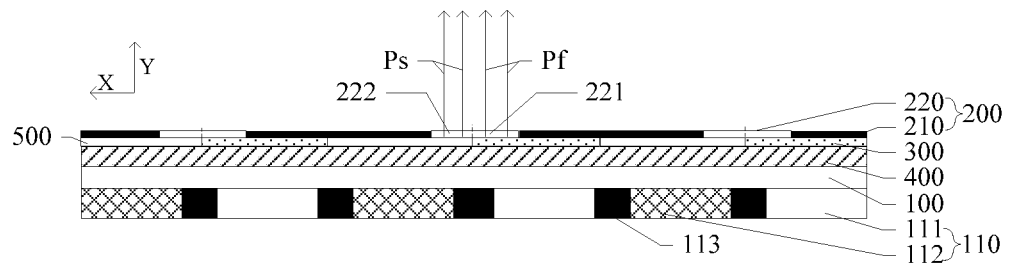
FIG. 2 is a schematic partial diagram of a display substrate provided by an embodiment of the present disclosure.

The present embodiment provides a display substrate. FIG. 2 is a schematic partial diagram of a display substrate provided by the present embodiment. As illustrated by FIG. 2, the display substrate includes a base substrate 100, a plurality of pixels 110 located on the base substrate 100 and arranged in an array along a first direction and a second direction which are intersected with each other, the plurality of pixels 110 include a plurality of first display regions 111 and a plurality of second display regions 112 which are alternately arranged along the first direction, a parallax barrier 200 located on the light emitting side of the display substrate, and a plurality of first phase delay films 300 located on the light emitting side of the display substrate. The parallax barrier 200 includes a plurality of light shielding portions 210 and a plurality of light transmitting portions 220 which are alternately disposed along the first direction. The present embodiment is described by taking a case where the first direction is perpendicular to the second direction as an example. Herein, the "first direction" refers to the X direction shown in FIG. 2, and the "second direction" refers to a direction perpendicular to the paper surface.

It should be noted that: the present embodiment is described by taking a case where the display substrate is a color filter substrate as an example. For example, the plurality of pixels on the base substrate can be a plurality of color filter regions defined by a black matrix.

For example, the plurality of color filter regions can include a red color filter region, a green color filter region, and a blue color filter region, thereby forming a red pixel, a green pixel, and a blue pixel. However, embodiments of the present disclosure are not limited thereto, and the plurality of pixels can include pixels of other colors. In the present embodiment, the parallax barrier 200 and the first phase delay films 300 are located on the light emitting side of the display substrate, i.e., the parallax barrier 200 and the first phase delay films 300 are located on the side of the plurality of pixels 110 facing the base substrate 100. The present embodiment is described by taking a case where the parallax barrier 200 and the first phase delay films 300 are disposed on the side of the base substrate 100 away from the plurality of pixels 110 as an example, but the present embodiment includes but is not limited thereto. In the present embodiment, the plurality of pixel structures are located on the underside of the base substrate, as illustrated by FIG. 2. However, the plurality of pixel structures can also be located on the upper side of the base substrate. In addition, in the case where the display substrate according to embodiments of the present disclosure is an array substrate, each of the plurality of pixels can include a pixel electrode, a common electrode, and a thin film transistor and other components.

As illustrated by FIG. 2, each of the light transmitting portions 220 is opposite to a pair of the first display region 111 and the second display region 112 adjacent to each other, i.e., along the Y direction, each of the light transmitting portions 220 is adjacent to a pair of the first display region 111 and the second display region 112 adjacent to each other. In other words, along the Y direction, each of the light transmitting portions 220 directly faces a pair of the first display region 111 and the second display region 112 adjacent to each other. The plurality of light shielding portions 210 and the plurality of light transmitting portions 220 each extends in the second direction perpendicular to the first direction, and each of the plurality of light transmitting portions 220 includes a first light transmitting region 221 and a second light transmitting region 222 in sequence along the X direction. The present embodiment is described by taking a case where a size of the first light transmitting region 221 is the same as that of the second light transmitting region 222 along the X direction as an example. However, the present embodiment is not limited thereto. For example, the sizes of the first light transmitting region 221 and the second light transmitting region 222 along the X direction can also be different. In the present embodiment, a case where each of the display regions (each of the plurality of first display regions or each of the plurality of second display regions) includes a pixel column arranged along the second direction is described as an example, however, each of the display regions can also include a plurality of pixel columns.

For example, as illustrated by FIG. 2, the plurality of first phase delay films 300 respectively correspond to the first light transmitting regions 221 of the plurality of light transmitting portions 220 along the Y direction, i.e., the first light transmitting regions 221 completely fall into an orthographic projection of the first phase delay films 300 on the parallax barrier 200, and the orthographic projection of the first phase delay films 300 on the parallax barrier 200 is not overlapped with the second light transmitting regions 222. The present embodiment is described by taking a case where the orthographic projection of the first phase delay films 300 on the parallax barrier 200 is overlapped with the light shielding portions 210 as an example. The present embodiment includes but is not limited thereto. For example, the orthographic projection of the first phase delay films on the parallax barrier can also be not overlapped with the light shielding portions.

It should be noted that, the first phase delay films 300 provided in the present embodiment are configured to make polarized light emitted from the first light transmitting regions 221 and polarized light emitted from the second light transmitting regions 222 of the display substrate respectively have a first polarization direction Pf and a second polarization direction Ps, and the first polarization direction Pf is different from the second polarization direction Ps. The parallax barrier in the display substrate provided by the present embodiment plays a light splitting role, and the display substrate is mainly used for the double-view display. Image light of the first display regions forms a first view region on a left side of the display substrate after passing through the light transmitting portions of the parallax barrier, image light of the second display regions forms a second view region on a right side of the display substrate after passing through the light transmitting portions of the parallax barrier, and an overlapped region of the first view region and the second view region at a middle position of the display substrate forms a crosstalk region. In the crosstalk region, the images displayed by the first display regions and the second display regions can be seen at the same time. A first view image displayed by the first display regions emits the polarized light through the first light transmitting region, and the polarized light of the first view image has a first polarization direction, and a second view image displayed by the second display regions emits the polarized light through the second light transmitting region, the polarized light of the second view image has a second polarization direction. Because the first polarization direction is different from the second polarization direction, a user can only see one of the view images in the crosstalk region by wearing polarized glasses applied with the first polarization direction or the second polarization direction, without being affected by the crosstalk, so as to achieve a purpose of seeing a view image in the crosstalk region and increasing a viewing angle.

For example, as illustrated by FIG. 2, the plurality of light shielding portions 210 and the plurality of light transmitting portions 220 included in the parallax barrier 200 can be located in the same layer, so that the thickness of the parallax barrier 200 can be reduced.

For example, forming the light shielding portions 210 and the light transmitting portions 220 can include: printing or photo-etching the light shielding portions 210 at intervals on a transparent film or glass. The present embodiment includes but is not limited thereto. For example, the parallax barrier can further include a transparent substrate on which the light shielding portions are arranged at intervals, all intervals among the light shielding portions form the light transmitting portions, i.e., regions on the transparent substrate which are not arranged with light shielding portions form the plurality of light transmitting portions. In this case, the thickness of the transparent substrate can be selected as thin as possible, so as to make the overall thickness of the parallax barrier as thin as possible. Herein, the plurality of light shielding portions and the plurality of light transmitting portions which are alternately disposed can achieve an effect of light splitting.

For example, the size of each of the plurality of light shielding portions 210 along the X direction is greater than the size of each of the plurality of light transmitting portions 220 along the X direction, but the present embodiment is not limited thereto.

For example, as illustrated by FIG. 2, an example of the present embodiment is described by taking a case where the plurality of light shielding portions 210 and the plurality of light transmitting portions 220 are in the same layer, and the first phase delay films 300 are located on a side of the parallax barrier 200 facing the base substrate 100 as an example.

The present embodiment includes but is not limited thereto. For example, the first phase delay films can also be located on a side of the parallax barrier away from the base substrate.

For example, as illustrated by FIG. 2, the display substrate further includes a polarizer 400 on a side of the first phase delay films 300 facing the base substrate 100, i.e., a polarizer 400 is disposed between the base substrate 100 and the first phase delay films 300. It should be noted that: the present embodiment is described by taking a case where the display substrate is a color filter substrate as an example, but the present embodiment is not limited thereto, and the display substrate can also be an array substrate of a light emitting diode, but a polarizer or a polarizer layer is required to be disposed on the light emitting side of the array substrate.

For example, the linearly polarized light emitted from the polarizer 400 and the second light transmitting regions 222 has the second polarization direction Ps, and the linearly polarized light emitted from the polarizer 400 is still linearly polarized light after passing through the first phase delay films 300 and the first light transmitting regions 221, and has the first polarization direction Pf. The first polarization direction Pf is rotated by a certain angle with respect to the second polarization direction Ps.

For example, the first phase delay films 300 can include a ½ wave plate, and the wave plate is a parallel flat sheet made of a crystal. Upon a light vector (polarization direction) of the linearly polarized light emitted from the polarizer 400 being at an angle of 45° to the fast axis (or slow axis) of the ½ wave plate, in a process that the linearly polarized light passes through the ½ wave plate, the light vector is rotated by 90° toward the fast axis (or slow axis). In other words, the polarization direction of the linearly polarized light emitted from the polarizer 400 is rotated by 90° after passing through the first phase delay films 300. The present embodiment includes but is not limited thereto. In the abovementioned case, the first polarization direction Pf and the second polarization direction Ps are perpendicular to each other. Therefore, the display substrate provided by the present embodiment can increase the viewing angle by adopting a combination of the parallax barrier and the specially designed phase delay film. That is, upon the user wearing polarized glasses (a light transmitting direction of the polarized glasses is the same as the first polarization direction Pf or the second polarization direction Ps of the polarized light emitted from the display substrate), the user can only see the image of the first view or the image of the second view in the crosstalk region of the display substrate, thereby achieving a purpose of increasing the viewing angle.

It should be noted that, the first phase delay films provided by the present embodiment can also be other components changing the polarization direction of the linearly polarized light.

For example, as illustrated by FIG. 2, the display substrate further includes a plurality of second phase delay films 500 located on the light emitting side of the display substrate, and the plurality of second phase delay films 500 correspond to the second light transmitting regions 222 of the plurality of light transmitting portions 220, respectively. In other words, the second transmitting regions 222 completely fall into an orthographic projection of the second phase delay films 500 in the Y direction on the parallax barrier 200, and the orthographic projection of the second phase delay films 500 on the parallax barrier 200 is not overlapped with the first light transmitting regions 221 along the X direction. The second phase delay films 500 and the first phase delay films 300 are alternately arranged along the X direction, and the phase delay amount of each of the second phase delay films 500 is different from the phase delay amount of each of the first phase delay films 300.

For example, as illustrated by FIG. 2, the present embodiment is described by taking a case where the second phase delay films 500 directly contact the first phase delay films 300 in the X direction as an example. The present embodiment includes but is not limited thereto. For example, the second phase delay films 500 and the first phase delay films 300 can also be located only at the light transmitting portions 220, that is, the light transmitting portions 220 completely fall into orthographic projections of the second phase delay films 500 and the first phase delay films 300 on the parallax barrier 200, and the orthographic projections of the second phase delay films 500 and the first phase delay films 300 on the parallax barrier 200 are not overlapped with the light shielding portions 210.

For example, the first phase delay film 300 can include a ½ wavelength plate, and the second phase delay film 500 can include a zero wave plate (corresponds to a filmless layer), and the emitted linearly polarized light passing through the polarizer 400 and the first phase delay film 300 has the first polarization direction Pf, and the emitted linearly polarized light passing through the polarizer 400 and the second phase delay film 500 has the second polarization direction Ps, wherein the second polarization direction Ps is the same as a polarization direction of the emitted linearly polarized light only passing through the polarizer 400. The present embodiment includes but is not limited thereto. For example, the first phase delay film 300 can include a zero wave plate, and the second phase delay film 500 can include a ½ wave plate. In the present embodiment, the polarization direction of the linearly polarized light emitted from the polarizer is adjusted by using the phase delay film, and it can be achieved that the first polarization direction of the polarized light emitted from the first light transmitting region of the display substrate and the second polarization direction of the polarized light emitted from the second light transmitting region of the display substrate can be different.

For example, both the first phase delay film 300 and the second phase delay film 500 include ½ wave plates, but fast axes of the ½ wave plates included in the first phase delay film 300 and the second phase delay film 500 have different directions.

For example, the fast axis of the ½ wave plate included in the first phase delay film 300 has an angle of 45° with the fast axis of the ½ wave plate included in the second phase delay film 500, the linearly polarized light emitted from the polarizer 400 has the first polarization direction Pf after passing through the first phase delay film 300, and the linearly polarized light emitted from the polarizer 400 has the second polarization direction Ps after passing through the second phase delay film 500. The first polarization direction Pf is perpendicular to the second polarization direction Ps. Therefore, the display substrate provided in the present embodiment can increase the viewing angle by adopting the parallax barrier combined with the specially designed phase delay film.

For example, the first phase delay film 300 can include a ¼ wave plate, and the second phase delay film 500 can include a ¾ wave plate. Upon a light vector of the linearly polarized light emitted from the polarizer 400 being at an angle of ±45° with the fast axes (slow axes) of the ¼ wave plate and the ¾ wave plate, linearly polarized light passing through the ¼ wave plate becomes circularly polarized light, and linearly polarized light passing through the ¾ wave plate becomes circularly polarized light as well, whose rotation direction is reverse to a rotation direction of the circularly polarized light passing through the ¼ wave plate. As a result, the linearly polarized light emitted from the polarizer 400 passes through the first phase delay film 300 and the second phase delay film 500, respectively, to obtain the circularly polarized light with reverse rotation directions. The present embodiment includes but is not limited thereto. For example, the linearly polarized light emitted from the polarizer 400 can also become elliptically polarized light with different rotation directions after passing through the first phase delay film 300 and the second phase delay film 500, respectively (the angle between the light vector of the linearly polarized light emitted from the polarizer 400 and the fast axes or the slow axes of the ¼ wave plate and the ¾ wave plate is not ±45°). Therefore, the display substrate provided by the present embodiment can increase a viewing angle by adopting the parallax barrier combined with the specially designed phase delay film. That is, upon the user wearing polarized glasses (the polarized glasses can be a mode combining a ¼ wave plate and a linearly polarized glasses), the user can only see the image of the first view or the image of the second view in the crosstalk region of the display substrate, thereby achieving a purpose of increasing a viewing angle.

It should be noted that the phase delay film provided in the present embodiment can also be other components that change the linearly polarized light into circularly polarized light.

For example, as illustrated by FIG. 2, an example of the present embodiment is described by taking a case where the second phase delay films 500 and the first phase delay films 300 are located in the same layer as an example. The present embodiment includes but is not limited thereto. For example, the second phase delay films 500 and the first phase delay films 300 can also be located in different layers.

For example, as illustrated by FIG. 2, a center line extending along the second direction (i.e., a direction perpendicular to the paper surface) of an interval between the first display region 111 and second display region 112 adjacent to each other is overlapped with a center line extending along the second direction of the light transmitting portion 220 corresponding to the first display region 111 and the second display region 112 adjacent to each other. In this case, the center line of the light transmitting portion 220 extending along the second direction is a boundary line between the first transmitting region 221 and the second transmitting region 222 along the X direction, that is, a size of the first transmitting region 221 along the X direction is the same as that of the second light transmitting region 222. A boundary line between the first phase delay film 300 and the second phase delay film 500 in the center region of the display substrate, a boundary line between the first light transmitting region 221 and the second light transmitting region 222, and the center line of an interval between the adjacent ones of the first display regions 111 and the second display regions 112 extending along the second direction are located in a line along the Y direction, that is, the display substrate provided by the present embodiment adopts a vertical alignment technology. The present embodiment can achieve a good display effect by adding the phase delay film combined with a vertical alignment technology, such that users respectively located in the left and right view regions can obtain substantially same visual experience, thereby improving the visual effect.

For example, as illustrated by FIG. 2, a black matrix 113 is disposed between the adjacent ones of the first display regions 111 and the second display regions 112, and the interval between the adjacent ones of first display regions 111 and the second display regions 112 is the black matrix 113 between the adjacent ones of the first display regions 111 and the second display regions 112.

For example, as illustrated by FIG. 2, the first display regions 111 are located in a region where the light shielding portions 210 are located and the first light transmitting regions 221, and the second display regions 112 are located in a region where the light shielding portions 210 are located and the second light transmitting regions 222. That is, an orthographic projection of the first display regions 111 on the parallax barrier 200 falls within the region where the light shielding portions 210 are located and the first light transmitting regions 221, and is not overlapped with the second light transmitting regions 222; an orthographic projection of the second display regions 112 on the parallax barrier 200 falls within the region where the light shielding portions 210 are located and the second light transmitting regions 222, and is not overlapped with the first light transmitting regions 221. Therefore, the configuration provided by the present embodiment that the first display region is located in the first light transmitting region can allow most light of the first display region to emit from the first transmitting region, and the configuration that the second display region is located in the second light transmitting region can allow most light of the second display region to emit from the second light transmitting region.

Figure 3A:
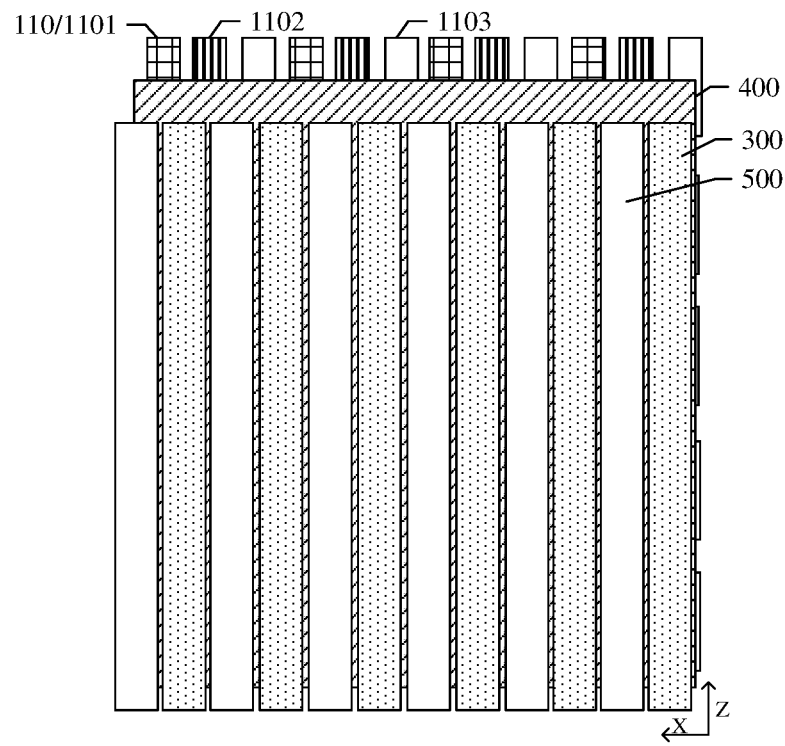
FIG. 3a-FIG. 3b are schematic structural diagrams of partial layer structures of a display substrate provided by an embodiment of the present disclosure.
Figure 3B:
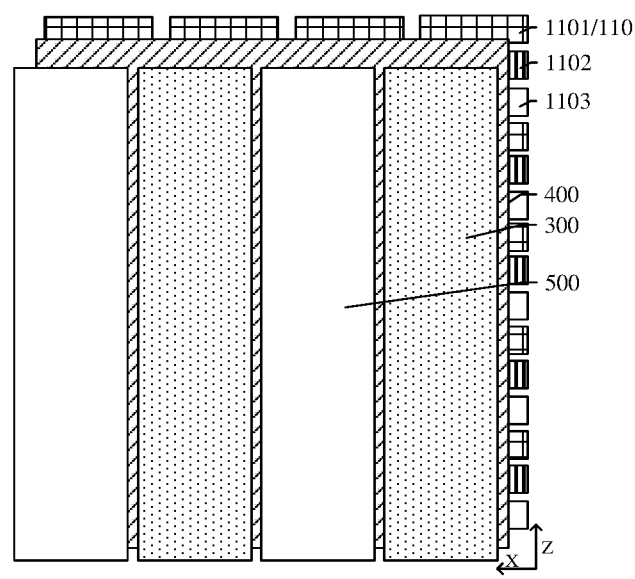

FIG. 3a and FIG. 3b are schematic diagrams of partial layer structures of a display substrate provided by the present embodiment. As illustrated by FIG. 3a, the arrangement manner of the pixels 110 corresponds to the arrangement manner of a horizontal screen, that is, sub pixels included in the pixels 110 are alternately arranged in the X direction.

For example, the pixels 110 include a red pixel 1101, a green pixel 1102, and a blue pixel 1103. One phase delay film extending in the second direction (Z direction in FIG. 3a) corresponds to one pixel column arranged in the Z direction, that is, each of the first display regions and each of the second display regions can respectively be a pixel column. The present embodiment includes but is not limited thereto. For example, each of the first display regions and each of the second display regions can respectively include a plurality of pixel columns.

As illustrated by FIG. 3b, the arrangement manner of the pixels 110 corresponds to an arrangement manner of a vertical screen, that is, sub pixels included in the pixels 110 are alternately arranged in the Z direction.

For example, the pixels 110 include a red pixel 1101, a green pixel 1102, and a blue pixel 1103. One phase delay film extending in the Z direction corresponds to one pixel column arranged in the Z direction, that is, each of the first display regions and each of the second display regions can respectively be one pixel column. The present embodiment includes but is not limited thereto. For example, each of the first display regions and each of the second display regions can respectively include a plurality of pixel columns.

Figure 4:
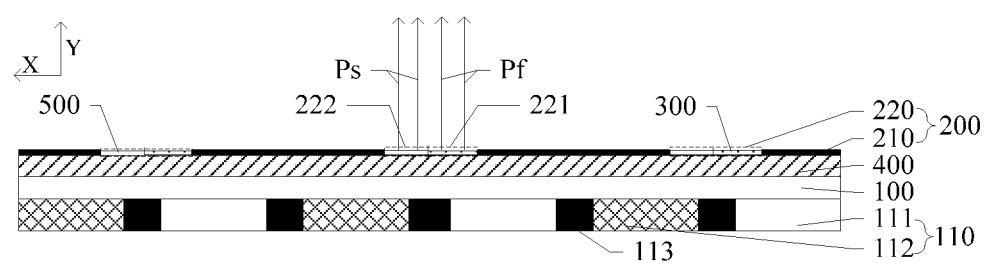
FIG. 4 is a schematic partial diagram of a display substrate provided by an embodiment of the present disclosure.

FIG. 4 is a schematic partial diagram of a display substrate provided by another example of the present embodiment. As illustrated by FIG. 4, the present example is described by taking a case where the light transmitting portions 220 are intervals among the light shielding portions 210, and the first phase delay films 300, the second phase delay films 500 and the light shielding portions 210 are located in the same layer as an example. Besides, a size of each of the first phase delay films 300 in the X direction is the same as that of each of the first light transmitting regions 221 in the X direction, and a size of each of the second phase delay films 500 in the X direction is the same as a size of each of the second light transmitting regions 222 in the X direction. The first phase delay films 300, the second phase delay films 500, and the light shielding portions 210 are located in the same layer to reduce the thickness of the display substrate.

Second Embodiment

Figure 5:
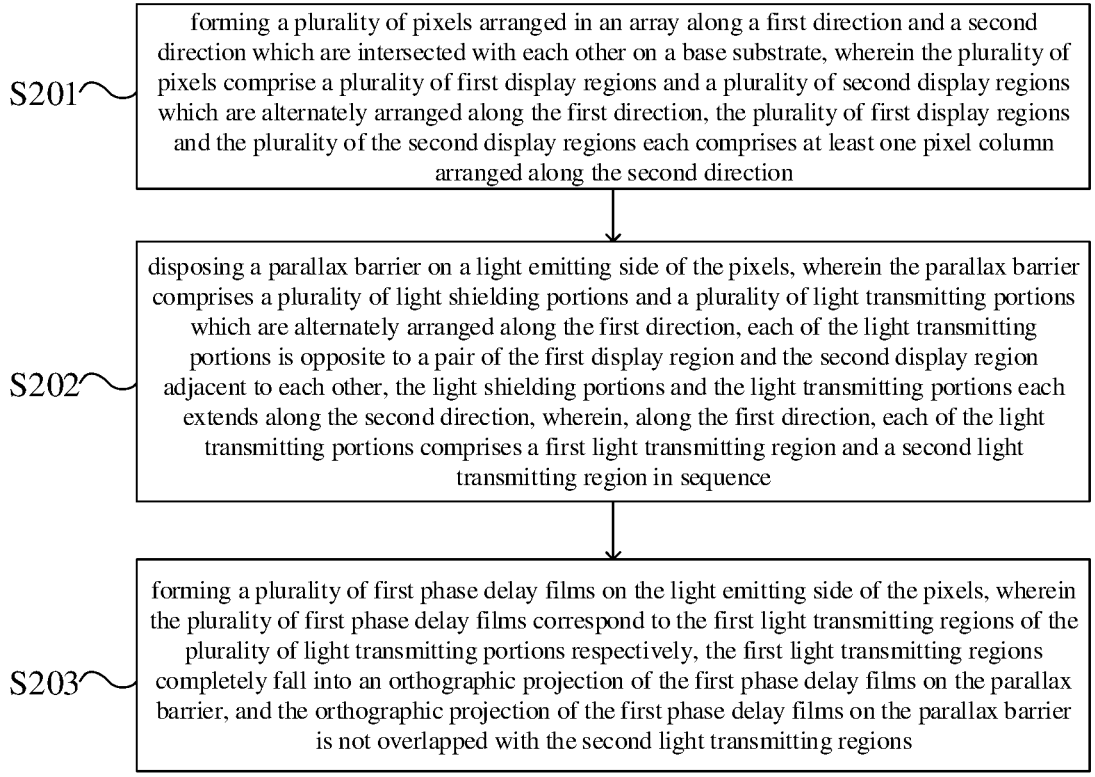
FIG. 5 is a schematic diagram of manufacturing steps of a manufacturing method of a display substrate provided by an embodiment of the present disclosure.

The present embodiment provides a manufacturing method of a display substrate. The manufacturing steps of the manufacturing method of the display substrate are illustrated by FIG. 5, and the specific steps are provided as follows:

S201: forming a plurality of pixels arranged in an array along a first direction and a second direction which are intersected with each other on a base substrate, wherein the plurality of pixels comprise a plurality of first display regions and a plurality of second display regions which are alternately arranged along the first direction, the plurality of first display regions and the plurality of the second display regions each comprises at least one pixel column arranged along the second direction.

For example, the present embodiment is described by taking a case where the display substrate is a color filter as an example. For example, the plurality of pixels on the base substrate can be a plurality of color filter regions defined by a black matrix.

For example, the plurality of color filter regions can include a red color filter region, a green color filter region, and a blue color filter region, thereby forming a red pixel, a green pixel, and a blue pixel. However, embodiments of the present disclosure are not limited thereto, and the plurality of pixels can include pixels of other colors. The present embodiment is not limited thereto. In a case where the display substrate according to embodiments of the present disclosure is an array substrate, each of the plurality of pixels can include a pixel electrode, a common electrode, and a thin film transistor and other components.

S202: disposing a parallax barrier on a light emitting side of the pixels, wherein the parallax barrier comprises a plurality of light shielding portions and a plurality of light transmitting portions which are alternately arranged along the first direction, each of the light transmitting portions is opposite to a pair of the first display region and the second display region adjacent to each other, the light shielding portions and the light transmitting portions each extends along the second direction, wherein, along the first direction, each of the light transmitting portions comprises a first light transmitting region and a second light transmitting region in sequence.

For example, the parallax barrier is located on the light emitting side of the display substrate, i.e., the parallax barrier is located on a side of the plurality of pixels facing the base substrate. The present embodiment is described by taking a case where the parallax barrier is located on a side of the base substrate away from the pixels as an example. The present embodiment includes but is not limited thereto.

S203: forming a plurality of first phase delay films on the light emitting side of the pixels, wherein the plurality of first phase delay films correspond to the first light transmitting regions of the plurality of light transmitting portions respectively, the first light transmitting regions completely fall into an orthographic projection of the first phase delay films on the parallax barrier, and the orthographic projection of the first phase delay films on the parallax barrier is not overlapped with the second light transmitting regions.

It should be noted that, the plurality of first phase delay films provided by the present embodiment are configured to make polarized light emitted from the first light transmitting region of the display substrate and polarized light emitted from the second light transmitting region of the display substrate respectively have a first polarization direction and a second polarization direction. The first polarization direction and the second polarization direction are different. The display substrate manufactured by the manufacturing method provided by the present embodiment is mainly used for the double-view display. Image light of the first display regions forms a first view region on a left side of the display substrate after passing through the light transmitting portions of the parallax barrier, image light of the second display regions forms a second view region on a right side of the display substrate after passing through the light transmitting portions of the parallax barrier, and an overlapped region of the first view region and the second view region at a middle position of the display substrate forms a crosstalk region. In the crosstalk region, the images displayed by the first display regions and the second display regions can be seen at the same time. A first view image displayed by the first display regions emits the polarized light through the first light transmitting region, and the polarized light of the first view image has a first polarization direction, and a second view image displayed by the second display regions emits the polarized light through the second light transmitting region, the polarized light of the second view image has a second polarization direction. Because the first polarization direction is different from the second polarization direction, a user can only see one of the view images in the crosstalk region by wearing polarized glasses applied with the first polarization direction or the second polarization direction, without being affected by the crosstalk, so as to achieve a purpose of seeing a view image in the crosstalk region and increasing a viewing angle.

For example, the present embodiment is described by taking an example where the orthographic projection of the first phase delay films on the parallax barrier is overlapped with the light shielding portions as an example, but the present embodiment includes but is not limited thereto. For example, the orthographic projection of the first phase delay films on the parallax barrier is not overlapped with the light shielding portions.

For example, an example of the present embodiment is described by taking a case where the plurality of light shielding portions and the plurality of light transmitting portions are located in the same layer, and the first phase delay films are formed on a side of the parallax barrier facing the base substrate as an example. However, the present embodiment includes but is not limited thereto. For example, the first phase delay films can also be formed on the side of the parallax barrier away from the base substrate.

For example, the manufacturing method of the display substrate provided by the present embodiment further includes: disposing a polarizer on a side of the plurality of first phase delay films facing the base substrate, i.e., before forming the first phase delay films, disposing the polarizer on a side of the base substrate away from the plurality of pixels. It should be noted that, the present embodiment is described by taking a case where the display substrate is a color filter substrate as an example, but the present embodiment is not limited thereto. For example, the display substrate can also be an array substrate of a light emitting diode, but a polarizer or a polarizing layer needs to be provided on the light emitting side of the array substrate.

For example, the linearly polarized light emitted from the polarizer and the second light transmitting regions has the second polarization direction, and the linearly polarized light emitted from the polarizer, the first phase delay films, and the first light transmitting regions has the first polarization direction. The first polarization direction is rotated by a certain angle with respect to the second polarization direction.

For example, the first phase delay film can include a ½ wave plate. Upon a polarization direction of the linearly polarized light emitted from the polarizer being at an angle of 45° to the fast axis of the ½ wave plate, the polarization direction of the linearly polarized light emitted from the polarizer is rotated by 90° after passing through the first phase delay films, i.e., the first polarization direction is perpendicular to the second polarization direction. Therefore, the manufacturing method of the display substrate provided by the present embodiment can increase the viewing angle by adopting a combination of the parallax barrier and the specially designed phase delay film. That is, upon the user wearing polarized glasses (a light transmitting direction of the polarized glasses is the same as the first polarization direction or the second polarization direction of the polarized light emitted from the display substrate), the user can only see the image of the first view or the image of the second view in the crosstalk region of the display substrate, thereby achieving a purpose of increasing a viewing angle.

For example, the manufacturing method of the display substrate provided by the present embodiment further includes: forming a plurality of second phase delay films on the base substrate, wherein the plurality of second phase delay films correspond to the second light transmitting regions of the plurality of light transmitting portions respectively, the second light transmitting regions completely fall into an orthographic projection of the second phase delay films on the parallax barrier, and the orthographic projection of the second phase delay films on the parallax barrier is not overlapped with the first light transmitting regions. The plurality of second phase delay films and the plurality of first phase delay films are alternately arranged along the first direction, and a phase delay amount of each of the plurality of second phase delay films is different from a phase delay amount of each of the plurality of first phase delay films. The present embodiment is described by taking a case where the second phase delay films directly contact the first phase delay films in the first direction as an example. The present embodiment includes but is not limited thereto. For example, the second phase delay films and the first phase delay films can also be located only in the light transmitting portions.

For example, each of the first phase delay films can include a ½ wavelength plate, and each of the second phase delay films can include a zero wave plate (corresponds to a filmless layer), and the emitted linearly polarized light passing through the polarizer and the first phase delay films has the first polarization direction, and the emitted linearly polarized light passing through the polarizer and the second phase delay films has the second polarization direction, the second polarization direction is different from the first polarization direction, so as to achieve a purpose of increasing a viewing angle upon the user wearing polarized glasses.

For example, both the first phase delay films and the second phase delay films include ½ wave plates, but fast axes of the ½ wave plates included in the first phase delay films and the second phase delay films have different directions, so as to achieve a purpose that the first polarization of the polarized light passing through the first phase delay films is perpendicular to the second polarization of the polarized light passing through the second phase delay films. Therefore, the purpose of increasing a viewing angle can be achieved by adopting a combination of the parallax barrier and the specially designed phase delay film.

For example, each of the first phase delay films can include a ¼ wave plate, and each of the second phase delay films can include a ¾ wave plate. Upon a light vector of the linearly polarized light emitted from the polarizer being at an angle of ±45° with the fast axis (slow axis) of the ¼ wave plate and the ¾ wave plate, linearly polarized light passing through the ¼ wave plate becomes circularly polarized light, and linearly polarized light passing through the ¾ wave plate becomes circularly polarized light as well, whose rotation direction is reverse to the rotation direction of the circularly polarized light passing through the ¼ wave plate. As a result, the linearly polarized light emitted from the polarizer passes through the first phase delay films and the second phase delay films, respectively, to obtain the circularly polarized light with reverse rotation directions. Therefore, the display substrate provided by the present embodiment can increase a viewing angle by adopting the parallax barrier combined with the specially designed phase delay film. That is, upon the user wearing polarized glasses (the polarized glasses can be a mode combining a ¼ wave plate and a linearly polarized glasses), the user can only see the image of the first view or the image of the second view in the crosstalk region of the display substrate, thereby achieving a purpose of increasing a viewing angle.

For example, an example of the present embodiment is described by taking a case where the second phase delay films and the first phase delay films are formed in the same layer as an example. The present embodiment includes but is not limited thereto. For example, the second phase delay films and the first phase delay films can also be formed in different layers.

For example, a center line extending along the second direction of an interval between the first display region and second display region adjacent to each other is overlapped with a center line extending along the second direction of the light transmitting portion corresponding to the first display region and the second display region adjacent to each other.

For example, a black matrix is disposed between the adjacent ones of the first display regions and the second display regions, and the interval between the adjacent ones of first display regions and the second display regions is the black matrix between the adjacent ones of the first display regions and the second display regions.

For example, the first display regions are located in a region where the light shielding portions are located and the first light transmitting regions, the second display regions are located in a region where the light shielding portions are located and the second light transmitting regions.

For example, the first phase delay films, the second phase delay films, and the light shielding portions can be located in the same layer, so as to reduce the thickness of the display substrate.

Third Embodiment

Figure 6:
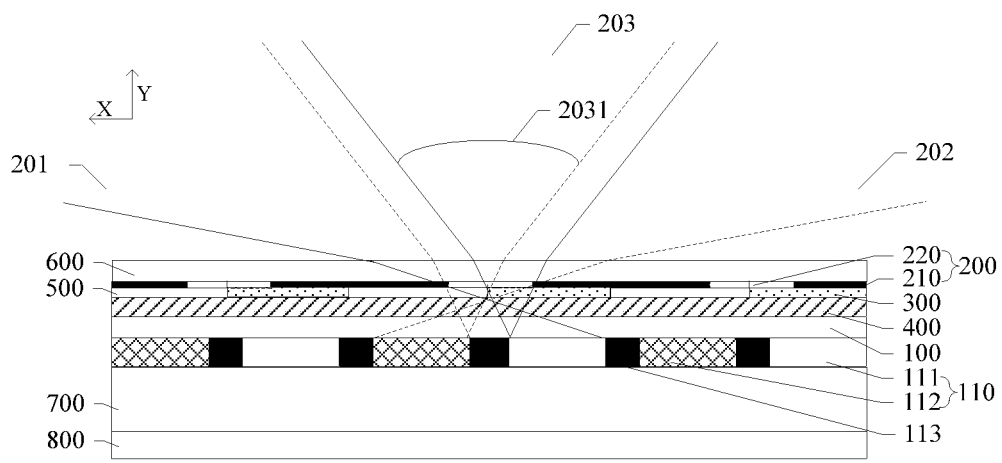
FIG. 6 is a schematic sectional diagram of a display panel provided by an embodiment of the present disclosure.

The present embodiment provides a display panel. FIG. 6 is a schematic sectional diagram of a display panel provided by the present embodiment. As illustrated by FIG. 6, the display panel includes the display substrate provided by any one of the embodiments of the present disclosure, and the present embodiment is described by taking a case where the display substrate is a color filter substrate as an example. The color filter substrate is located on a light emitting side of the display panel, and the light emitting direction of the color filter substrate is the same with that of the display panel, the light emitting direction refers to the Y direction illustrated in FIG. 6.

For example, as illustrated by FIG. 6, the display panel further includes an array substrate 800, a liquid crystal layer 700 located between the color filter substrate and the array substrate 800, and a cover plate glass 600 located on a side of the color filter substrate away from the array substrate. Image light of the first display regions 111 forms a first view region 201 after passing through the light transmitting portions 220 of the parallax barrier 200, image light of the second display regions 112 forms a second view region 202 after passing through the light transmitting portions 220 of the parallax barrier 200, and an overlapped region of the first view region 201 and the second view region 202 at a middle position of the display substrate forms a crosstalk region 203. In the crosstalk region 203, the images displayed by the first display regions 111 and the second display regions 112 can be seen at the same time. In the figure, the real lines refer to light rays emitted from the first display regions 111, and the dotted lines refer to light rays emitted from the second display regions 112.

For example, as illustrated by FIG. 6, a middle region 2031 of the crosstalk region 203 of the display panel includes the images of the first view of light emitted from the first display regions 111 after passing through the first phase delay films 300 and the images of the second view of light emitted from the first display regions 112 after passing through the second phase delay films 500. Because the polarization directions of the image light of two views in the middle region 2031 are different, a user can only see one of the views by wearing polarized glasses, so as to achieve seeing a view in the crosstalk region, thereby achieving a purpose of increasing a viewing angle. Because the display substrate in the display panel provided by the present embodiment adopts a vertical alignment technology, the angle of the middle region in the crosstalk region is relatively large, so as to reduce a range of the crosstalk region seen by the user after wearing polarized glasses.

In the present embodiment, the substrate having the parallax barrier and the phase delay film is a color filter substrate, and the opposed substrate is an array substrate. However, the embodiments of the present disclosure are not limited thereto. In the case where the substrate having the parallax barrier and the phase delay film is an array substrate, the opposed substrate is a color filter substrate; or, a COA (Color-filter on Array) structure adopting a combination of a color filter substrate and an array substrate, as long as the abovementioned parallax barrier and the phase delay film are located on the light emitting side of the display panel.

Fourth Embodiment

Figure 7:
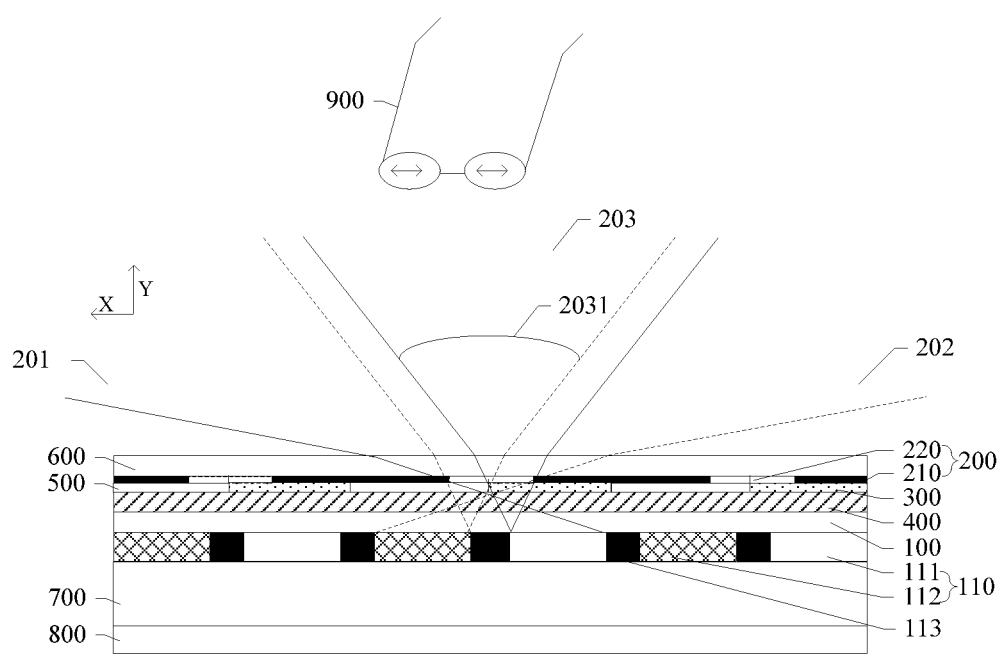
FIG. 7 is a schematic diagram of a display device provided by an embodiment of the present disclosure.

The present embodiment provides a display device, as illustrated by FIG. 7, the display device includes polarized glasses 900 and the display panel according to the third embodiment. A polarization direction of the polarized glasses 900 can be the same as the first polarization direction or the second polarization direction. In this case, the user can only see the first view displayed by the first display regions 111, image light of the first view has the first polarization direction after passing through the first phase delay films 300, or the user can only see the second view displayed by the second display regions 112, image light of the second view has the second polarization direction after passing through the second phase delay films 500, in the middle region 2031 of the crosstalk region 203 by wearing the polarized glasses 900.

For example, the polarization direction of the polarized glasses 900 can also be configured to be switchable between the first polarization direction and the second polarization direction. That is to say, the user can select to see the first view displayed by the first display regions 111 or the second view displayed by the second display regions 112 in the middle region 2031 of the crosstalk region 203 by wearing the same polarized glasses 900.

For example, upon the polarized glasses 900 being a linearly polarized glasses, the polarization direction can be changed by rotating the angle of the glasses, but the present embodiment is not limited thereto.

The display device provided by the present embodiment adopts a combination of a parallax barrier and a specially designed phase delay film, such that a user can see clear images in the crosstalk region after wearing the polarized glasses suiting the polarized light emitted from the display device, so as to achieve a purpose of increasing a viewing angle.

The following points should to be explained:

(1) Unless otherwise defined, in the embodiments and accompanying drawings in the present disclosure, the same reference numeral represents the same meaning.

(2) The accompanying drawings involve only the structure(s) in connection with the embodiment(s) of the present disclosure, and other structure(s) can be referred to common design(s).

(3) For the purpose of clarity, in accompanying drawings for illustrating the embodiment(s) of the present disclosure, layer(s) or region(s) may be enlarged. However, it should understood that, in the case in which a component or element such as a layer, film, region, substrate or the like is referred to be "on" or "under" another component or element, it may be directly on or under the another component or element or a component or element is interposed therebetween.

The foregoing is only the embodiments of the present disclosure and not intended to limit the scope of protection of the present disclosure, alternations or replacements which can be easily envisaged by any skilled person being familiar with the present technical field shall fall into the protection scope of the present disclosure. Thus, the protection scope of the present disclosure should be based on the protection scope of the claims.

What is claimed is:

1. A display substrate, comprising:
a base substrate;
a plurality of pixels, located on the base substrate and arranged in an array along a first direction and a second direction which are intersected with each other, wherein the plurality of pixels comprise a plurality of first display regions and a plurality of second display regions which are alternately arranged along the first direction, the plurality of first display regions and the plurality of the second display regions each comprises at least one pixel column arranged along the second direction;
a parallax barrier, located on a light emitting side of the display substrate and comprising a plurality of light shielding portions and a plurality of light transmitting portions which are alternately arranged along the first direction, wherein each of the light transmitting portions is opposite to a pair of the first display region and the second display region adjacent to each other, the light shielding portions and the light transmitting portions each extends along the second direction, wherein, along the first direction, each of the light transmitting portions comprises a first light transmitting region and a second light transmitting region in sequence;
a plurality of first phase delay films, located on the light emitting side of the display substrate and corresponding to the first light transmitting regions of the light transmitting portions respectively, wherein the first light transmitting regions completely fall into an orthographic projection of the first phase delay films on the parallax barrier, and the orthographic projection of the first phase delay films on the parallax barrier is not overlapped with the second light transmitting regions,
wherein the first phase delay films are configured to make polarized light emitted from the first light transmitting regions of the display substrate have a first polarization direction, and polarized light emitted from the second light transmitting regions of the display substrate have a second polarization direction, the first polarization direction is different from the second polarization.

2. The display substrate according to claim 1, further comprising:
a polarizer, located on a side of the first phase delay films facing the base substrate.

3. The display substrate according to claim 1, further comprising:
a plurality of second phase delay films, located on the light emitting side of the display substrate and corresponding to the second light transmitting regions of the plurality of light transmitting portions respectively, wherein the second light transmitting regions completely fall into an orthographic projection of the second phase delay films on the parallax barrier, and the orthographic projection of the second phase delay films on the parallax barrier is not overlapped with the first light transmitting regions, wherein the second phase delay films and the first phase delay films are alternately arranged along the first direction, and a phase delay amount of the second phase delay film is different from a phase delay amount of the first phase delay film.

4. The display substrate according to claim 1, wherein the polarized light is linearly polarized light, the first polarization direction is perpendicular to the second polarization direction.

5. The display substrate according to claim 3, wherein the polarized light is circularly polarized light, a rotation direction of circularly polarized light emitted from the first light transmitting regions of the display substrate is reverse to a rotation direction of circularly polarized light emitted from the second light transmitting regions of the display substrate.

6. The display substrate according to claim 3, wherein the second phase delay films and the first phase delay films are located in a same layer.

7. The display substrate according to claim 1, wherein a center line extending along the second direction of an interval between the first display region and second display region adjacent to each other is overlapped with a center line extending along the second direction of the light transmitting portion corresponding to the first display region and the second display region adjacent to each other, wherein, along the first direction, a size of the first light transmitting region is the same as a size of the second light transmitting region.

8. The display substrate according to claim 7, wherein the adjacent ones of the first display regions and the second display regions are provided with a black matrix therebetween.

9. The display substrate according to claim 1, wherein the display substrate is a color filter substrate.

10. The display substrate according to claim 1, wherein, an orthographic projection of the first display regions on the parallax barrier completely falls into the light shielding portions and the first light transmitting regions, an orthographic projection of the second display regions on the parallax barrier completely falls into the light shielding portions and the second light transmitting regions.

11. A display panel, comprising the display substrate according to claim 1, wherein the display substrate is located on the light emitting side of the display panel, and a light emitting direction of the display substrate is the same as a light emitting direction of the display panel.

12. A display device, comprising polarized glasses and the display panel according to claim 11, wherein a polarization direction of the polarized glasses is the same as the first polarization direction or the second polarization direction, or a polarization direction of the polarized glasses is configured to be switchable between the first polarization direction and the second polarization direction.

13. A manufacturing method of a display substrate, comprising:
forming a plurality of pixels arranged in an array along a first direction and a second direction which are intersected with each other on a base substrate, wherein the plurality of pixels comprise a plurality of first display regions and a plurality of second display regions which are alternately arranged along the first direction, the plurality of first display regions and the plurality of the second display regions each comprises at least one pixel column arranged along the second direction;

disposing a parallax barrier on a light emitting side of the pixels, wherein the parallax barrier comprises a plurality of light shielding portions and a plurality of light transmitting portions which are alternately arranged along the first direction, each of the light transmitting portions is opposite to a pair of the first display region and the second display region adjacent to each other, the light shielding portions and the light transmitting portions each extends along the second direction, wherein, along the first direction, each of the light transmitting portions comprises a first light transmitting region and a second light transmitting region in sequence;

forming a plurality of first phase delay films on the light emitting side of the pixels, wherein the plurality of first phase delay films correspond to the first light transmitting regions of the plurality of light transmitting portions respectively, the first light transmitting regions completely fall into an orthographic projection of the first phase delay films on the parallax barrier, and the orthographic projection of the first phase delay films on the parallax barrier is not overlapped with the second light transmitting regions, wherein the first phase delay films are configured to make polarized light emitted from the first light transmitting regions of the display substrate have a first polarization direction and polarized light emitted from the second light transmitting regions of the display substrate have a second polarization direction, the first polarization direction is different from the second polarization.

14. The manufacturing method of the display substrate according to claim 13, further comprising:
disposing a polarizer on a side of the first phase delay films facing the base substrate.

15. The manufacturing method of the display substrate according to claim 13, further comprising:
forming a plurality of second phase delay films on the base substrate, wherein the plurality of second phase delay films correspond to the second light transmitting regions of the plurality of light transmitting portions respectively, the second light transmitting regions completely fall into an orthographic projection of the second phase delay films on the parallax barrier, and the orthographic projection of the second phase delay films on the parallax barrier is not overlapped with the first light transmitting regions, wherein the second phase delay films and the first phase delay films are alternately arranged along the first direction, and a phase delay amount of the second phase delay film is different from a phase delay amount of the first phase delay film.

* * * * *